United States Patent
Reed

[11] 3,776,496
[45] Dec. 4, 1973

[54] INSTRUMENT MOUNT
[76] Inventor: Clifton G. Reed, 1322 Canterlane, Houston, Tex. 77047
[22] Filed: Jan. 26, 1972
[21] Appl. No.: 220,791

[52] U.S. Cl.............. 248/182, 33/291, 248/206 A
[51] Int. Cl............................................. F16m 11/14
[58] Field of Search................... 33/291; 248/180, 248/182, 206 A

[56] References Cited
UNITED STATES PATENTS
3,588,014  6/1971  Reed.................................. 248/180
3,068,573  12/1962  Sidwell...................... 248/206 A UX
1,778,481  10/1930  Boucher.................... 248/206 A UX
3,663,111  5/1972  Tsuda et al........................ 33/291 X Primary Examiner—Roy D. Frazier
Assistant Examiner—Richard L. Stroup
Attorney—Pravel, Wilson & Matthews

[57] ABSTRACT

The present invention provides a new and improved instrument mount such as for a leveling and sighting instrument, permitting improved leveling and sighting operations, particularly in windy and adverse weather conditions.

4 Claims, 4 Drawing Figures

PATENTED DEC 4 1973
3,776,496
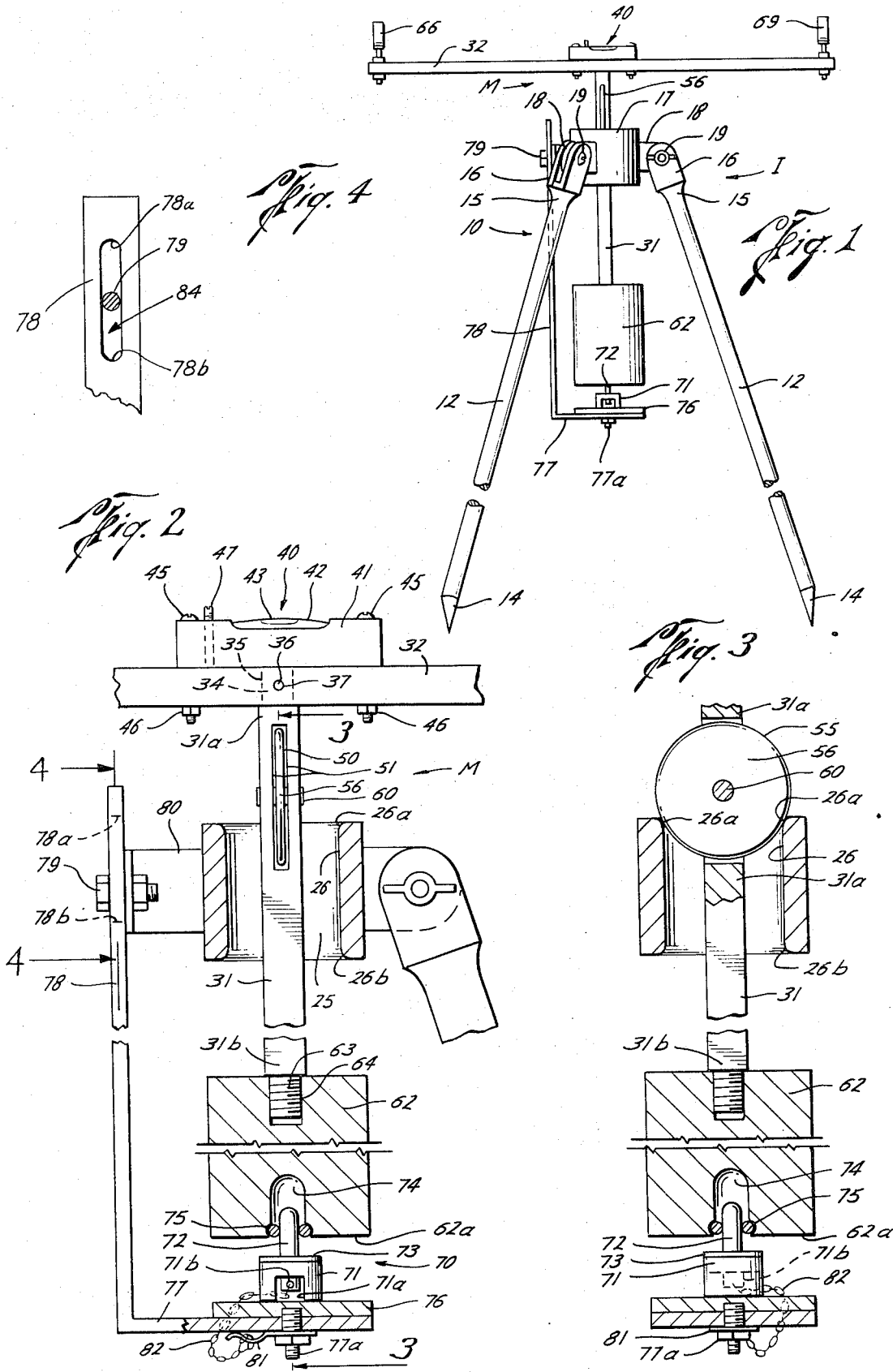

INSTRUMENT MOUNT

BACKGROUND OF THE INVENTION

1. Field of Invention

The present invention relates to instrument mounts for leveling and sighting instruments and the like.

2. Description of Prior Art

The instrument mount for leveling and sighting apparatus disclosed in my prior U. S. Pat. No. 3,588,014 permitted quick, accurate and simple leveling and sighting operations. A weight caused the instrument mount to assume the desired position and to maintain the sighting rod in a horizontal position for leveling and sighting operations. When the apparatus was used in windy weather, wind forces often became large enough to cause movement of the weight. The wind overcame the resisting force exerted on the weight by an adjustable screw and moved the weight and the instrument, complicating the leveling and surveying operations, increasing the time required for such operations, and their cost.

SUMMARY OF INVENTION

Briefly, the present invention provides a new and improved instrument mount for a leveling and sighting instrument used in leveling and surveying operations wherein a disc element having a rounded peripheral portion engages a supporting rim of an annular head, with the disc element pivotally resting on the supporting rim for relative movement therewith to move the instrument to the desired position for leveling and surveying operations, with a weight mounted on a support rod dependent from the disc element and causing the instrument to remain in the desired position during leveling and surveying operations, with a magnetic means retaining the weight in a fixed position relative to the head in order to prevent movement of the weight in windy and adverse weather conditions.

It is an object of the present invention to provide a new and improved instrument mount.

BRIEF DESCRIPTION OF THE DRAWINGS

FIG. 1 is an elevation view of the new and improved instrument mount of the present invention;

FIG. 2 is an elevation view, partly in section, of a portion of the instrument mount of FIG. 1;

FIG. 3 is a cross-sectional view, taken along the lines 3—3 of FIG. 2; and

FIG. 4 is a cross-sectional view taken along the lines 4 — 4 of FIG. 3.

DESCRIPTION OF PREFERRED EMBODIMENT

In the drawings, the letter I designates generally a leveling and sighting instrument with which the present invention is used. The instrument I is supported by a tripod 10 having at least three legs 12. A lower end 14 of each of the legs 12 is pointed for engagement with the ground or other surface, as it is well known in the art. A fork 16 is formed at an end 15 of each of the legs 12.

A supporting head or base member 17 has a plurality of outwardly extending mounting brackets or legs 18 which are mounted by pivot pins 19 or other suitable attaching means on the support bracket 16. The pivot pins 19 permit the legs 12 to pivot relative to the brackets 18 and allow the legs 12 to be swung inwardly and outwardly relatively to each other at their lower ends 14 in order to support the head 17 in an elevation above the ground or work site is desired.

It should be understood that the lugs 18 may be mounted with an outer surface 17a of the support head 17 in any suitable manner such as by welding, or by screws.

The support head 17 is shaped in the form of an annular ring, although other suitable forms may be used if desired. An opening 25 is formed in the support head 17 by melting, grinding or cutting. A rim 26 adjacent the opening 25 has rounded supporting surfaces 26a and 26b formed thereon.

An instrument mount M including a rod, support shaft, or connection member 31 having an upper end 31a and a lower end 31b is mounted, in a manner to be set forth hereinbelow, with the support head 17. A sighting bar 32 is mounted on and secured to an upper end 31a of the rod 31 transversely to such rod 31 at substantially the center of the sighting bar 32.

The upper end 31a of the rod 31 includes a recessed head portion 34 extending upwardly into an opening 35 in the sighting bar 32. A connection pin 36 extends through an opening 37 formed in the sight bar 32 and the rod 31 and connects the rod 31 and the sight bar 32 to each other.

A spirit level 40 of the conventional type having a cylinder 41 filled with oil or other liquid and a window 42 for viewing a bubble 43 is used with the instrument I to indicate the position of the sighting bar 32. The spirit level 40 has mounted at each end thereof hold members of the conventional type, each having a shaft extending downwardly through the bar 32. Bolts or screws 45 have nuts 46 threadedly engaged therewith to secure the spirit level 40 in a longitudinal substantially parallel position relative to the sight bar 32. A set screw or adjusting screw 47 is mounted with the spirit level 40 to adjust the relative position of the spirit level 40 with respect to the sight bar 32 and calibrate such position.

If desired, pads of rubber, leather or other suitable resilient material may be mounted between the spirit level 40 and the sight bar 32 in order to maintain the spirit level 40 and sight bar 32 in the desired position with respect to each other after adjustment by the screw 47.

A longitudinally extending slot 50 having sidewalls 51 is formed in the rod 31 for receiving a balancing or supporting means in the shape of a circular disc 56 having rounded edges 55 (FIG. 3). The disc 56 is centrally positioned relative to the slot 50 by a pin 60 extending through the disc 56 and the bar 31 (FIG. 2 and 3). Thus, the rounded edge 55 of the disc 56 engages and rests upon the edge 26a of the rim 26. The disc 56 may be rotated in order that other sections of the rounded edge 55 may be positioned for engagement with the rim portion 26a.

A weight 62 is threadedly engaged with the lower end 31b of the rod 31 (FIG. 2) by means of threads 63 extending outwardly into a threaded opening 64 formed in the weight 62. The weight 62 is mounted with the support rod 31 dependent from the disc 56 and causes the spirit level 40 and sight bar 32 to remain in the desired position during leveling and surveying operations. The weight 62 enables the disc 56 to pivot and rest on the rim 26a. Additionally, the weight 62 exerts sufficient downward force to maintain the disc 56 in a stationary position relative to the head 17.

An upwardly extending ring 66 (FIG. 1) is mounted by nuts and bolts or other suitable means to one end of the sighting rod 32. The ring 66 includes a perforated disc formed therein to form a peep hole for sighting. A similar disc 69 is mounted by nuts and bolts or other suitable means to the opposite end of the sighting bar 32. The disc 69 includes a crosshair or target or the like, as is well known in the art, for enabling the peep sight and crosshair to be aligned relative to each other during leveling and surveying operations.

A magnet retaining means 70 of the present invention is used to retain the weight 62 in a fixed position relative to the annular head 17 in order to prevent movement of the weight 62 in windy and adverse weather conditions.

The magnet retaining means 70 includes a cylindrical permanent magnet 71 having a channel 71a formed therethrough. A pin 72 extends upwardly from the magnet 71. The pin 72 is mounted with an upper non-magnetic plate 73 atop the magnet 71. The plate 73 assists in preventing the magnet 71 from being attracted to the weight 62.

The pin 72 extends upwardly into a socket 74 formed extending upwardly into a lower surface 62a of the weight 62. A retaining ring 75 is mounted in the socket 74 to engage the pin 72 and retain the pin in place with respect to the weight 62.

A plate 76 of iron or other suitable magnetically responsive material is mounted with the head 17, in a manner to be set forth hereinbelow, and reacts with the permanent magnet 71 to hold the magnet 71 in place with respect to the head 17. In this manner, the weight 62 is retained in position with respect to the head 17.

The plate 76 is mounted with an inwardly extending arm 77 of an L-shaped mounting bracket 78. The magnetically responsive plate 76 is mounted to the arm 77 by a bolt 77a or other suitable means. The mounting bracket 78 is mounted with a bolt 79 to an outwardly extending lug 80 formed by welding or other suitable techniques with the annular head 17. A longitudinal slot 84 (FIG. 4) through which the bolt 79 passes is formed in the bracket 78 between an upper surface 78a and a lower surface 78b to permit adjustable upward and downward movement of bracket 78 with respect to the lug 80 as required.

A clip spring 81 is mounted with the arm 77 by the bolt 77a. A chain 82 or other suitable retaining means is mounted with the clip spring 81 at a first end thereof and with a receiving socket 71b with the permanent magnet 71 and at an opposite end thereof. The clip spring 81 and the chain 82 mount the magnet 71 with the annular head 17, preventing loss or misplacing of the magnet 71 during dismantling and moving of the instrument I.

In the operation of the present invention, the tripod 10 is set at a desired location with the instrument mount M positioned relative to the annular head 17 so that the disc 56 is resting on the supporting rim 26a of the rim 26. The weight 62, extending vertically beneath the disc 56 in rod 31 causes the sighting rod 32 to assume a horizontal position. If adjustments are necessary, the disc 56 may be moved or rocked or positioned on the rim portion 26a until the sighting rod has been positioned relative to the horizontal and desired location, as indicated by the sighting level 40. When the instrument I of the present invention is used in windy and adverse weather conditions, the wind forces often become sufficiently great to exert sufficient force on the weight 62 to cause movement thereof, moving the weight 62 and the sight rod 32, complicating leveling and surveying operations.

With the present invention, the user grasps the magnet 71 and inserts the pin 72 past the retaining means 75 into the socket 74 in the weight 62 before adjusting the sight bar 32 to the level position. After inserting the pin 72 into the weight 62, the user then moves the weight 62 and magnet 71 relative to the magnetically responsive plate 76 until the magnet 71 reacts with the plate 76, attracting the magnet 71 and holding the magnet 71 firmly with respect to the plate 76. The user then slides the magnet 71 with respect to the plate 76, moving the weight 62 and support rod 31 relative to the head 17. The disc 56 at this time moves relative to the supporting rim 26a.

While moving the magnet 71 relative to the plate 76, the user observes the sight level 40 and continues movement of the magnet 71 with respect to the plate 76 until the sight level 40 indicates that the sight bar 32 is in a level position relative to the horizontal.

When the sight level 40 indicates that the sight rod 32 is in the horizontal position, the user may then begin the leveling and surveying operations. Forces caused by windy or adverse weather conditions exerted on the weight 62 are prevented from causing movement of the sight rod 32. The magnetic attraction between the plate 76 and magnet 71 causes firm engagement therebetween. The pin 72 mounted with the magnet 71 is accordingly fixed in position relative to the support head 17 due to the mounting therewith, as has been previously set forth. The pin 72 extending upwardly into the socket 74 of the weight 62 prevents movement of the weight 62 which retains the weight 62 in position with respect to the head 17, maintaining the sight bar 32 in the desired level position.

In this manner, the instrument I may be used in adverse windy weather conditions without undesirable movement of the weight 62 due to wind forces and the like.

It is to be understood that while a sight bar 32 has been described as mounted with the instrument mount M of the present invention in the instrument I, other instruments such as telescopes, and the like may be mounted with the mount M and used in the instrument I of the present invention.

The foregoing disclosure and description of the invention are illustrative and explanatory thereof, and various changes in the size, shape, and materials as well as in the details of the illustrated construction may be made without departing from the spirit of the invention.

I claim:

1. In an instrument mount for a leveling and sighting instrument used in leveling and surveying operations, including a disc element having a rounded peripheral portion engaging a supporting rim of an annular head, said disc element pivotally resting on said supporting rim for relative movement therewith to move the instrument to the desired position for leveling and surveying operations, and a weight mounted with a support rod dependent from the disc element and causing the instrument to remain in the desired position during leveling and surveying operations, said weight having an upwardly extending socket formed in a lower surface thereof, the improvement comprising:

magnet means for retaining said weight in a fixed position relative to said annular head, said magnet means comprising:

a. a magnet;

b. a pin mounted with said magnet and extending upwardly therefrom into said socket in said weight to hold said weight in position with respect to said magnet;

c. means mounted with said head for reacting with said magnet and holding said magnet in place with respect to said head, wherein said weight means is retained in position with respect to said head; and wherein movement of said weight in windy and adverse weather conditions is prevented.

2. The structure of claim 1, wherein said means for reacting with said magnet comprises:

a. a magnetically responsive plate; and b. mounting bracket means for mounting said magnetically responsive plate with said head.

3. The structure of claim 1, further including:

means for attaching said magnet to said head.

4. The structure of claim 1, further including: retaining ring means mounted in said socket in said weight for engaging said pin.

* * * * *